(12) United States Patent
Kifle et al.

(10) Patent No.: US 11,805,449 B2
(45) Date of Patent: Oct. 31, 2023

(54) RADIO RESOURCE SWITCHING IN PLATOONING

(71) Applicant: Nokia Solutions and Networks Oy, Espoo (FI)

(72) Inventors: Dereje Kifle, Stuttgart (DE); Oliver Blume, Stuttgart (DE); Hajo Bakker, Eberdingen (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 158 days.

(21) Appl. No.: 17/272,804

(22) PCT Filed: Sep. 3, 2018

(86) PCT No.: PCT/EP2018/073615
§ 371 (c)(1),
(2) Date: Mar. 2, 2021

(87) PCT Pub. No.: WO2020/048580
PCT Pub. Date: Mar. 12, 2020

(65) Prior Publication Data
US 2021/0274390 A1    Sep. 2, 2021

(51) Int. Cl.
*H04W 36/00* (2009.01)
(52) U.S. Cl.
CPC ... *H04W 36/0009* (2018.08); *H04W 36/0072* (2013.01)
(58) Field of Classification Search
USPC .......................................................... 370/331
See application file for complete search history.

(56) References Cited

U.S. PATENT DOCUMENTS

| 2004/0058678 A1* | 3/2004 | deTorbal ............... H04W 36/32 455/99 |
| 2011/0206002 A1* | 8/2011 | Jeon .................. H04W 36/0009 370/331 |

(Continued)

FOREIGN PATENT DOCUMENTS

| EP | 3361818 A1 | 8/2018 |
| WO | WO-2012134116 A2 * | 10/2012 ........ H04W 36/0055 |

(Continued)

OTHER PUBLICATIONS

CA Office Action for Indian Application No. 202147014256 dated Feb. 8, 2022.

(Continued)

*Primary Examiner* — Gregory B Sefcheck
*Assistant Examiner* — Majid Esmaeilian
(74) *Attorney, Agent, or Firm* — Harness, Dickey & Pierce, P.L.C.

(57) ABSTRACT

It is provided a method, comprising monitoring if a request for a handover of a platoon leader from a source cell to a target cell is received, wherein the request for the handover comprises a description of the required resources for platoon leader and all platoon members; and the method further comprises configuring the platoon leader and the platoon members with a new resource allocation if the request for the handover is received; informing the source cell on the new resource allocation and reserving or pre-reserving the resources in at least one of the source and target cell; supervising if the trigger event has occurred; activating the new resource allocation in the platoon leader and the platoon members if the activation command is received.

16 Claims, 12 Drawing Sheets

(56) References Cited

U.S. PATENT DOCUMENTS

| | | | | |
|---|---|---|---|---|
| 2015/0327127 A1* | 11/2015 | Centonza | .......... | H04W 36/0055 |
| | | | | 455/436 |
| 2017/0289864 A1 | 10/2017 | Narasimha et al. | | |
| 2021/0258853 A1* | 8/2021 | Wang | ................ | H04W 28/0268 |
| 2022/0046486 A1* | 2/2022 | Shrestha | ............... | H04W 12/03 |
| 2022/0046491 A1* | 2/2022 | Shrestha | ........... | H04W 36/0072 |
| 2022/0322161 A1* | 10/2022 | Xu | .................... | H04W 36/0009 |

FOREIGN PATENT DOCUMENTS

| | | |
|---|---|---|
| WO | WO-2017/105151 A1 | 6/2017 |
| WO | WO-2017/119919 A1 | 7/2017 |
| WO | WO-2017119919 A1 * | 7/2017 |

OTHER PUBLICATIONS

International Search Report for International Application No. PCT/EP2018/073615 dated Feb. 13, 2019.

Written Opinion of the International Searching Authority for International Application No. PCT/EP2018/073615 dated Feb. 13, 2019.

* cited by examiner

1
- Target radio cell cannot support the radio resource allocation of a platoon served by source cell, e.g. SPS #1 resource allocation of source cell

2
- Platoon leader(PL) requests HO,
- PL informs about ID of last PM
- Target cell defines new SPS#2 resource allocation and configures the PL with SPS#2
- SPS#2 resource not yet used

3
- Communication between target and source basestation about SPS#2 resource allocation
- Source basestation configures all platoon members (PMs) still in source cell with SPS#2 resource allocation, SPS#2 resource not yet used

4
- Last PM request HO
- Switch to SPS#2 resources by PL and PMs, release of SPS#1 resources

Figure 2

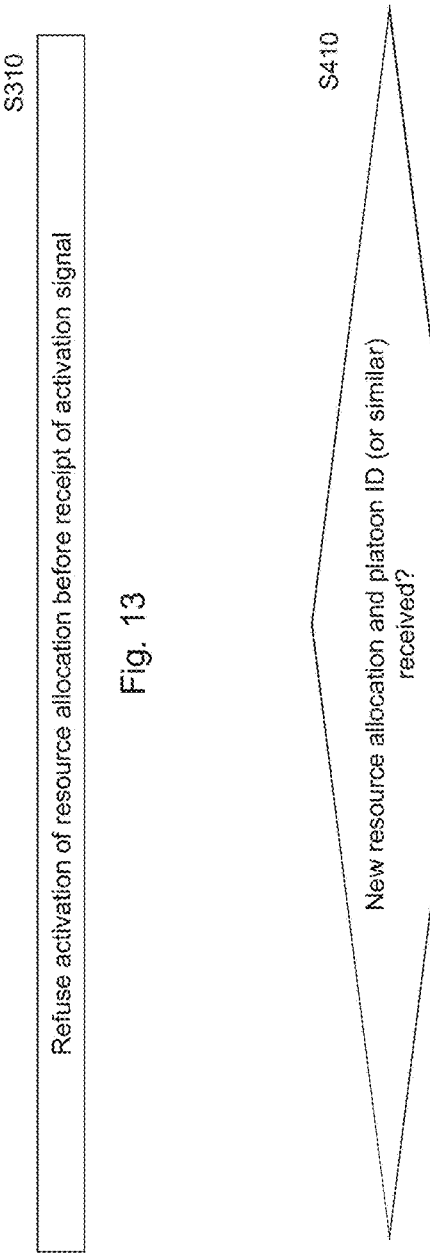
Fig. 13
Fig. 15
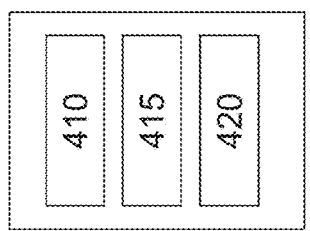
Fig. 14
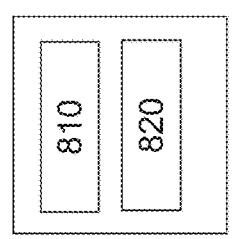
Fig. 16

RADIO RESOURCE SWITCHING IN PLATOONING

CROSS-REFERENCE TO RELATED APPLICATIONS

This application is a national phase under 35 U.S.C. § 371 of PCT International Application No. PCT/EP2018/073615 which has an International filing date of Sep. 3, 2018, the entire contents of which are hereby incorporated by reference.

FIELD OF THE INVENTION

The present invention relates to an apparatus, a method, and a computer program product related to supporting platooning by a 3GPP network.

Abbreviations

3GPP $3^{rd}$ Generation Partnership Project
4G/5G $4^{th}/5^{th}$ Generation
D2D Device to device
eNB evolved NodeB
E-UTRAN evolved UTRAN
gNB Next generation NodeB
HO Handover
ID Identifier
IE information element
L2/L3 Layer 2/Layer 3 (of OSI model)
LTE Long Term Evolution
NR New Radio
PL Platoon Leader
PM Platoon Member
PRB Physical Resource Block
QoS Quality of Service
RAN Radio Access Network
RNTI Radio Network Temporary Identifier
RRC Radio Resource Control
RSU Road Side Unit
SPS Semi-Persistent Scheduling
TB Transport Block
TTI Transmission Time Interval
UE User Equipment
V2V Vehicular to Vehicular
V2X Vehicular to Everything

BACKGROUND OF THE INVENTION

3GPP (in particular 5G or beyond) intends to support the communication within a group of UEs following the same path. One example is the platooning of vehicles, especially lorries/trucks on a highway. The corresponding requirements on 3GPP network for V2X communication are:

When the vehicles are travelling on the road, they can dynamically form a platoon. The platoon creator (also named platoon leader or platoon manager) is responsible for platoon management. The manager should real-time update surrounding traffic data reported by group members, and reported it to RSU; At the same time, the platoon manager should real-time receive RSU messages which include road conditions and traffic information far away from them, and share them with platoon members. All the platoon members can also share the information within the group through V2V.

All the platoon members can obtain information through two ways. One is within platoon through V2V. Another is from RSU relayed by the platoon manager. All the information obtained will be used to build high-precision dynamic driving maps and to coordinate the movement of the platoon. Information exchange between vehicles can be a new type of "ask-response".

[PR.5.17-001] The 3GPP system shall be able to support reliable V2V communications between a specific UE supporting V2X applications and up to 19 other UEs supporting V2X applications.

V2X and V2V communications are special cases of D2D communication (sometimes referred to as sidelink). D2D supports direct communications between devices that are in proximity, wherein the communication does not traverse the base station (e.g. gNB) of the core network.

During the RAN Plenary Meeting #80, June 11th-14th, 2018, a new study item on NR V2X was agreed. The use case "Vehicles Platooning" is included and the main objectives are defined as: Uu-based allocation/configuration of sidelink resources and study sidelink L2/L3 protocols.

A platoon comprises of a platoon leader (PL) and a number (one or more) of platoon members (PM). The platoon is identified by a platoon ID.

The platoon leader (PL) within a platoon defines the relevant manoeuvres (lane change, breaking, distance between the platoon member (PM) . . . ). Typically, the PL may be the vehicle of the platoon travelling first in the direction of travel. A vendor specific (VW, MAN) or standardized algorithm may be responsible for this task. If not otherwise stated or made clear from the context, within this application the platoon leader is different from the platoon member(s), i.e., the platoon leader is not considered as a platoon member.

A main part of the communication between the trucks will be based on V2V communication (Sidelink), probably with a Semi Persistent Scheduling (SPS) resource allocation as commands from the PL to the PMs and keep alive messages from the PMs to the PL will be based on periodic information exchange.

A basic handover management scheme for a platoon and a HO scheme for a platoon to reduce messages on the Uu interface are known in the art.

A reservation scheme requesting D2D resource allocation within other base stations is described in PCT/EP2018/067343. A request to several base stations is proposed, which leads to reservation of resources for the platoon. In detail, the traveling path of a platoon is semi-static, long-haul and known to the serving network in advance. Therefore, a RAN level coordination between identified future serving cells for facilitating efficient predictive QoS control and mobility management of a platoon is proposed. The coordination is controlled either by the currently serving basestation or a server in the network. PCT/EP2018/067343 proposes that N of the identified successive future passing cells are requested whether they can provide the QoS, e.g. a D2D resource allocation, required by the platoon. For these cells, a primary committed serving cell group (PCSCG) is defined. For example, N can be set to the average number of identified cells which cover every next 10 km of travelling distance of the platoon. If the D2D resource allocation can be provided without any modification, there is no need for a reconfiguration of the V2V communication (Sidelink) during the handover between the cells. Thus, the operation of the sidelink is uninterrupted for the platoon movement through all of PCSCG. A new configuration of a PCSCG is not triggered at every handover, but e.g. only at every second or third handover in order to reduce signalling overhead.

Platooning of UEs is not covered by the LTE V2X specification, i.e. it is a new topic for NR. Within the T-doc RP-181480 [2] for the RAN #80 plenary meeting in June 2018 a new SID: "Study on NR V2X" was agreed. The topics platooning and sidelink L2/L3 protocols are mentioned.

SUMMARY OF THE INVENTION

It is an object of the present invention to improve the prior art.

According to a first aspect of the invention, there is provided an apparatus, comprising means for monitoring configured to monitor if a request for a handover of a platoon leader of a platoon from a source cell to a target cell is received from the source cell, wherein the request for the handover of the platoon leader comprises an identifier of the platoon; and the apparatus further comprises means for configuring configured to configure the platoon leader with a new resource allocation if the request for the handover of the platoon leader is received; means for informing configured to inform the source cell on the new resource allocation along with at least one of the identifier of the platoon, an identifier of the platoon leader, and a reference to the request for the handover of the platoon leader; means for checking configured to check if a trigger event occurs; means for activating configured to activate the new resource allocation in the platoon leader if the trigger event occurs.

According to a second aspect of the invention, there is provided an apparatus, comprising means for refusing configured to refuse activating of a new resource allocation before an activation signal is received, wherein the new resource allocation is received from a serving cell serving a terminal.

According to a third aspect of the invention, there is provided an apparatus, comprising means for monitoring configured to monitor if a new resource allocation is received along with an information enabling the apparatus to identify a platoon; means for identifying configured to identify platoon members of the platoon based on the information enabling the apparatus to identify the platoon if the new resource allocation is received along with the information enabling the apparatus to identify the platoon; means for configuring configured to configure the platoon members of the platoon with the new resource allocation.

According to a fourth aspect of the invention, there is provided a method, comprising monitoring if a request for a handover of a platoon leader of a platoon from a source cell to a target cell is received from the source cell, wherein the request for the handover of the platoon leader comprises an identifier of the platoon; and the method further comprises configuring the platoon leader with a new resource allocation if the request for the handover of the platoon leader is received; informing the source cell on the new resource allocation along with at least one of the identifier of the platoon, an identifier of the platoon leader, and a reference to the request for the handover of the platoon leader; checking if a trigger event occurs; activating the new resource allocation in the platoon leader if the trigger event occurs.

According to a fifth aspect of the invention, there is provided a method, comprising refusing activating of a new resource allocation before an activation signal is received, wherein the new resource allocation is received from a serving cell serving a terminal.

According to a sixth aspect of the invention, there is provided a method, comprising monitoring if a new resource allocation is received along with an information enabling to identify a platoon; identifying platoon members of the platoon based on the information enabling to identify the platoon if the new resource allocation is received along with the information enabling to identify the platoon; configuring the platoon members of the platoon with the new resource allocation.

Each of the methods of the fourth to sixth aspects may be a method of platoon communication.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some example embodiments of the invention, at least one of the following advantages may be achieved:
  maintaining the ultra-short latency and reliability requirements for platooning;
  exploiting 3GPP infrastructure for platooning.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred example embodiments of the present invention which is to be taken in conjunction with the appended drawings, wherein:

FIG. 2 shows a method according to an example embodiment of the invention;

FIG. 12 shows an apparatus according to an example embodiment of the invention;

FIG. 13 shows a method according to an example embodiment of the invention;

FIG. 14 shows an apparatus according to an example embodiment of the invention;

FIG. 15 shows a method according to an example embodiment of the invention;

FIG. 16 shows an apparatus according to an example embodiment of the invention.

DETAILED DESCRIPTION OF CERTAIN EXAMPLE EMBODIMENTS

Herein below, certain example embodiments of the present invention are described in detail with reference to the accompanying drawings, wherein the features of the example embodiments can be freely combined with each other unless otherwise described. However, it is to be expressly understood that the description of certain example embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

In platooning, the following message exchange should be supported:
PL→PMs (instruction for platoon operation)
PMs→PL (confirmation of instruction, keep alive messages, requests, e.g. leave platoon)
PM→PM (internal communication, may be vendor specific)

The allocation of these messages with respect to timing must take into account the half-duplex restriction for D2D communication (V2V and V2X communications are special cases of D2D communication), i.e. if the PL transmits the PMs can only listen. A transmission towards the PL is not possible at this time. The same restriction holds for the reverse direction and for communication between two PMs.

Thus, for the entire platoon one dedicated resource allocation should be selected with fulfils the requirements from the platoon algorithms and the half duplex restriction. As these messages are typically exchanged in a periodical manner, a SPS resource allocation for each PM and the PL may be applied.

Figure 1:
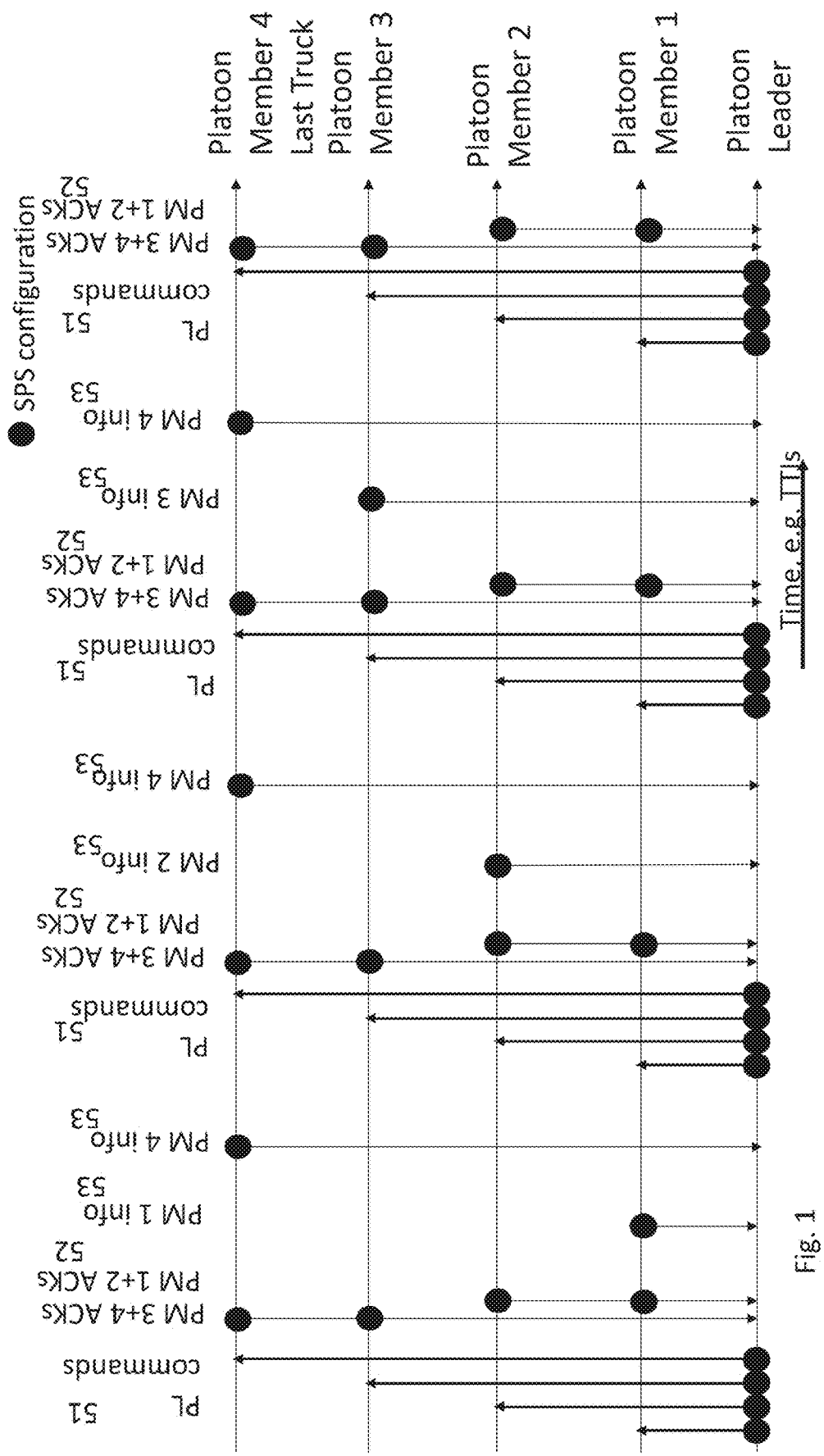
FIG. 1 shows an example SPS transmission scheme for a platoon of one PL and 4PMs.

FIG. 1 shows an example SPS transmission scheme for a platoon of one PL and 4PMs. As may be seen in FIG. 1, PL transmits regularly PL commands 51 to the PMs. These PL commands are acknowledged 52 by the PMs, wherein, in this example, PMs 3+4 acknowledge simultaneously, and PMs 1+2 acknowledge simultaneously (but at different frequencies). In between, any of the PMs may send an information 53 to PL. Depending on implementation, PL may or may not acknowledge receipt of the PM information.

Each platoon traveling on a motorway will pass several radio cells, i.e. many Uu based handovers from a source cell to a new target cell will occur. If the UE (PL, PM) is served by the target cell, also sidelink SPS resources are newly configured for the platoon (e.g. towards PL and PMs).

It is assumed that the platoon sidelink resource allocation can be provided by many base stations along the route of the platoon, e.g. based on PCT/EP2018/067343.

If the platoon travels several hundreds of kilometres, it cannot be excluded that a target radio cell cannot provide the SPS resource allocation of the source cell (SPS #1), i.e. a new resource allocation (SPS #2 different from SPS #1) will be provided to the platoon.

Each of the PL and PMs performs the Uu handover individually. For example, starting with the Uu based handover procedure of the PL and followed by handover of the succeeding PM1 the platoon is served by two base stations for some time before the remaining PMs handover to the target base station, too.

As mentioned above, with each HO a new SPS resource allocation is provided within the target radio cell by the new basestation. Consequently, according to the prior art, the PL and PM1 are configured with SPS #2 and use the resources allocated by SPS #2 while the remaining PMs of the platoon are still configured with SPS #1 and use the resources allocated by SPS #1.

This might lead to problems with respect to the half-duplex transmission and to interference in case other cars in the serving cell are configured with resources belonging to the SPS #2 definition. Consequently, the required QoS of the platoon might be degraded leading e.g. to an increase of the distance between the trucks, as messages from the PL to the PMs might not decodable.

Some example embodiments of the invention address the switching time from SPS #1 to SPS #2 and the configuration and activation of the new SPS #2 resource allocation.

A method according to an example embodiment of the invention is depicted in FIG. 2 and described hereinafter:

1: A platoon is approaching a target radio cell. Prior to the radio based Uu handover, the target cell is requested to provide semi persistent scheduling resources. For example, the request may be based on the procedure described in PCT/EP2018/067343. Step 1 is not essential for the invention.

2: The platoon leader requests handover. The HO request may contain the ID of a dedicated platoon member or another indication of the dedicated platoon member (e.g. an arbitrary position in the sequence of PMs). In the example of FIG. 2, the dedicated PM is the last platoon member. The target cell defines a new SPS #2 resource allocation which fulfils the resource requirements of the platoon. The platoon leader is configured with SPS #2, but SPS #2 will not yet be used. In other words, SPS #1 is still activated, and SPS #2 is not yet activated. Configuring a UE (such as the platoon leader) with a resource allocation includes pre-reservation of the respective resources at the cell (see below).

3: The target base station informs the source base station about the SPS #2 resource allocation. The source base station configures the SPS #2 resource allocation to all platoon members still in the source cell. The SPS #2 resources are not yet activated.

4: The dedicated PM (i.e. last platoon member in the example of FIG. 2) requests handover. The target base station triggers the switch from SPS #1 resource allocation to the SPS #2 resource allocation (i.e. activates the SPS #2 resource allocation). In addition, it may trigger the source base station to release the resources of the SPS #1 resource allocation.

The steps of the example embodiment of FIG. 2 are now explained at greater detail with reference to FIGS. 3 to 9. FIGS. 3 to 9 show the status of the platoon and the network (source cell: Radio cell #1, target cell: Radio cell #2) and the related message exchange at different phases of the method of FIG. 2. In addition, variations of the method of FIG. 2 are described.

Figure 3:
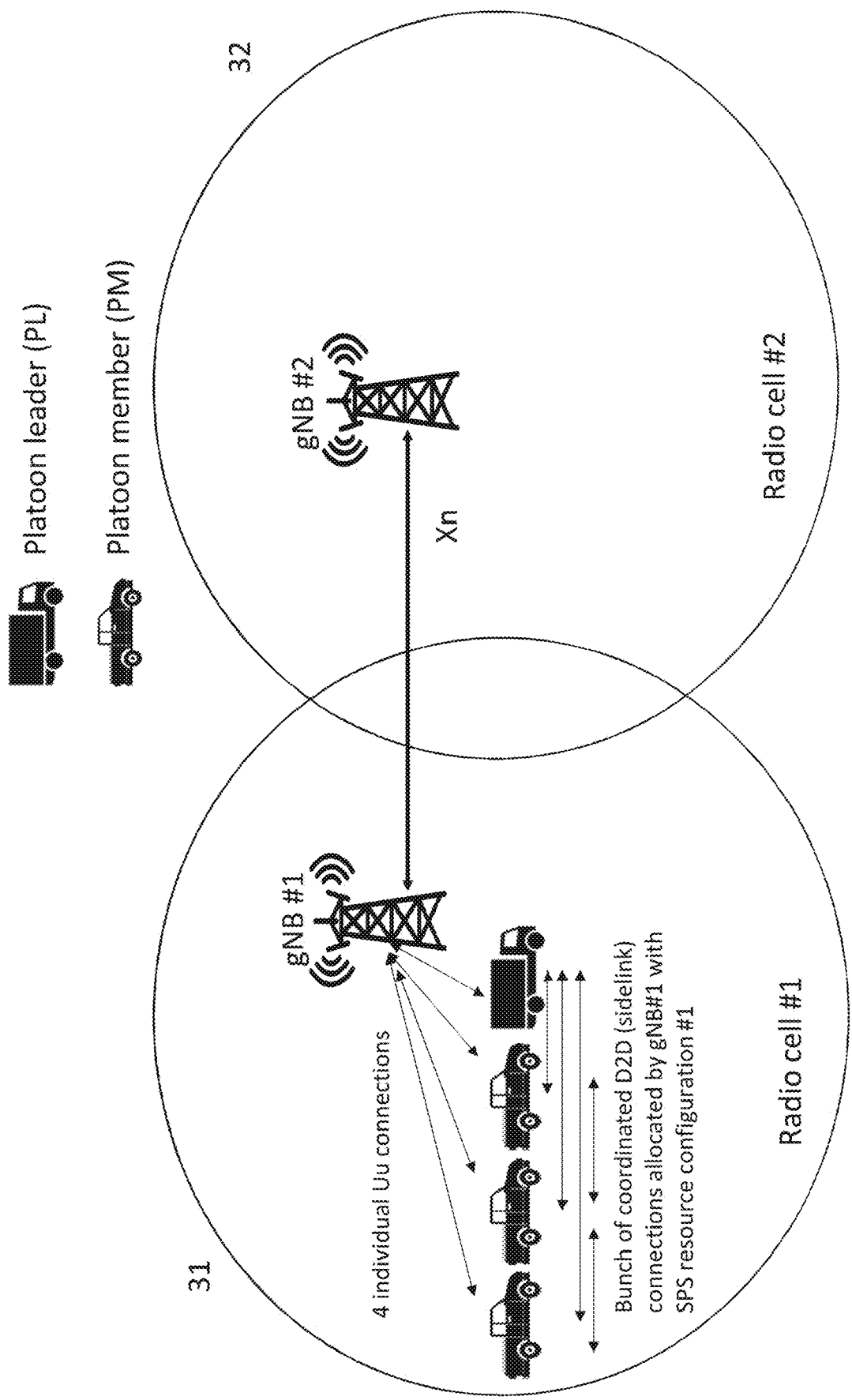
FIG. 3 shows the status of the platoon and the network when the method of FIG. 2 starts.

Step 1:

As shown in FIG. 3, a platoon communicating with a SPS #1 resource allocation and being served by gNB #1 moves from radio cell #1 (source cell 31) to radio cell #2 (target cell 32) of gNB #2. The gNB #2 might be informed, following the concept of PCT/EP2018/067343, about the arrival of the platoon with the SPS resource allocation #1.

In general, source cell 31 and target cell 32 may be cells of the same gNB or of different gNBs (as shown in FIG. 3). If the source cell 31 and the target cell 32 are of the same gNB, the communication between gNBs depicted below takes place within the one gNB.

The optimal solution for the platoon operation would be an unchanged SPS resource allocation for the V2X sidelink communication which might be used from e.g. Hamburg to Munich (a lot of handovers). If for an upcoming handover of the PL the target cell 32 can accommodate the same SPS resources to the platoon, the target cell 32 reserves these sidelink resources. Consequently, the SPS resource allocation does not change during HO of the PL and of the PMs and no additional signalling messages beyond the concept of PCT/EP2018/067343 are required.

However, as the platoon passes several radio cells, the same resource allocation most probably cannot always be provided by all base stations on the route. E.g. there might be high load on resources on the sidelink already allocated to other cars (UEs).

If the gNB #2 cannot provide the SPS #1 resource allocation to the platoon, a second SPS #2 resource allocation defined by gNB #2 may fulfil the resource requirements of the platoon. For example, the SPS #2 resource allocation might just be the same as the SPS #1 resource allocation but shift in time, e.g. by n TTIs.

During the movement, the platoon will span over two radio cells. While each platoon member and the platoon leader can carry out individually a Uu based handover, or a corresponding more advanced procedure, the entire platoon must use only one SPS resource allocation for the V2V communication between the PL and PMs, i.e. either SPS #1 or SPS #2.

Figure 4:
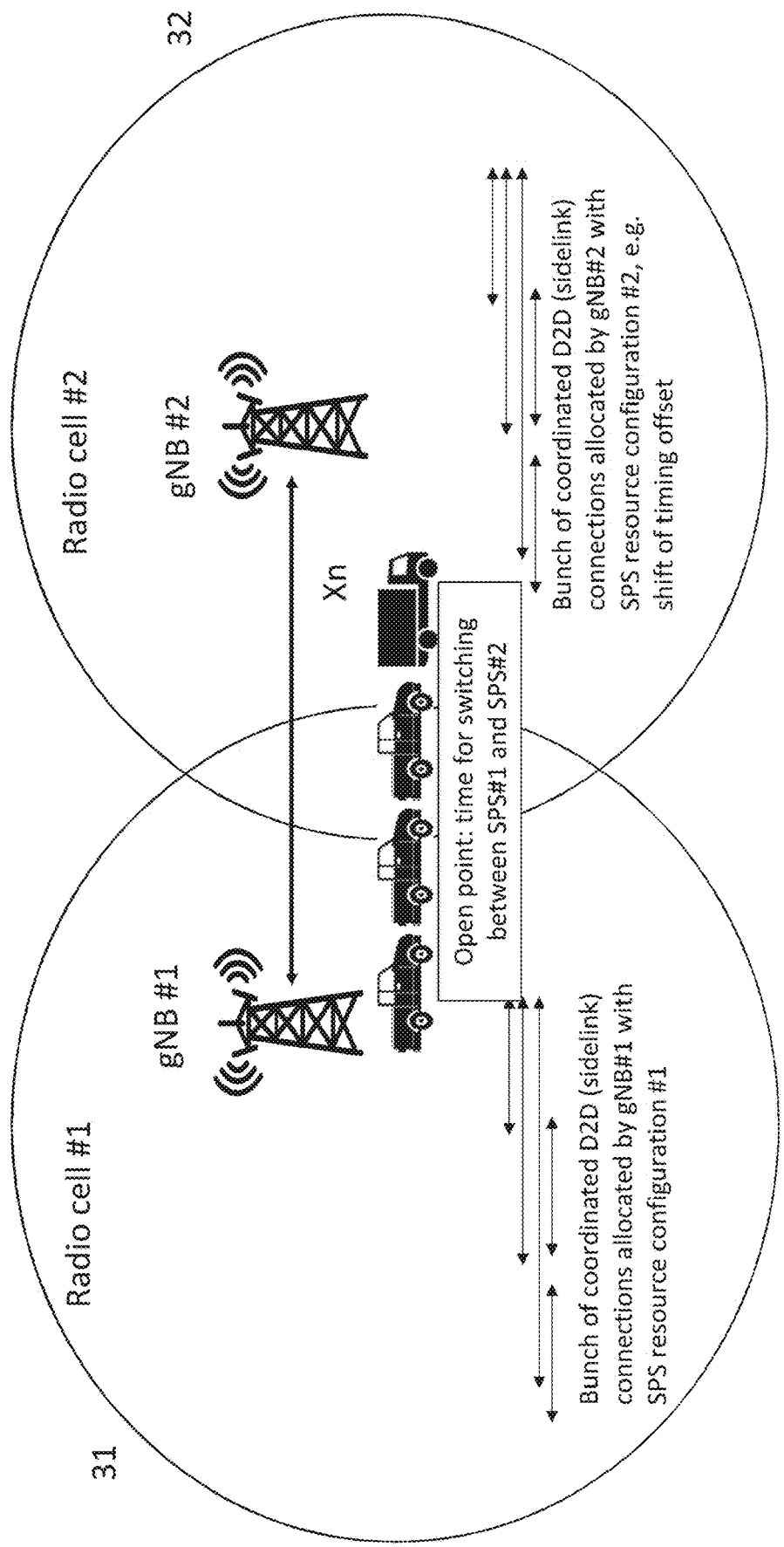
FIG. 4 shows the status of the platoon and the network after a subset of the PMs performed handover to the target cell according to the prior art.

As shown in FIG. 4, according to the conventional LTE handover procedure, starting with the PL and followed by the first PM the PL and the first PM would be configured with SPS #2, while the remaining PMs would use SPS #1. Thus, D2D communication may be impaired or even impossible.

Some example embodiments of the invention provide a solution for the problem depicted in FIG. 4, i.e. the procedure and the timing to switch between two different SPS resource allocations.

Figure 5:
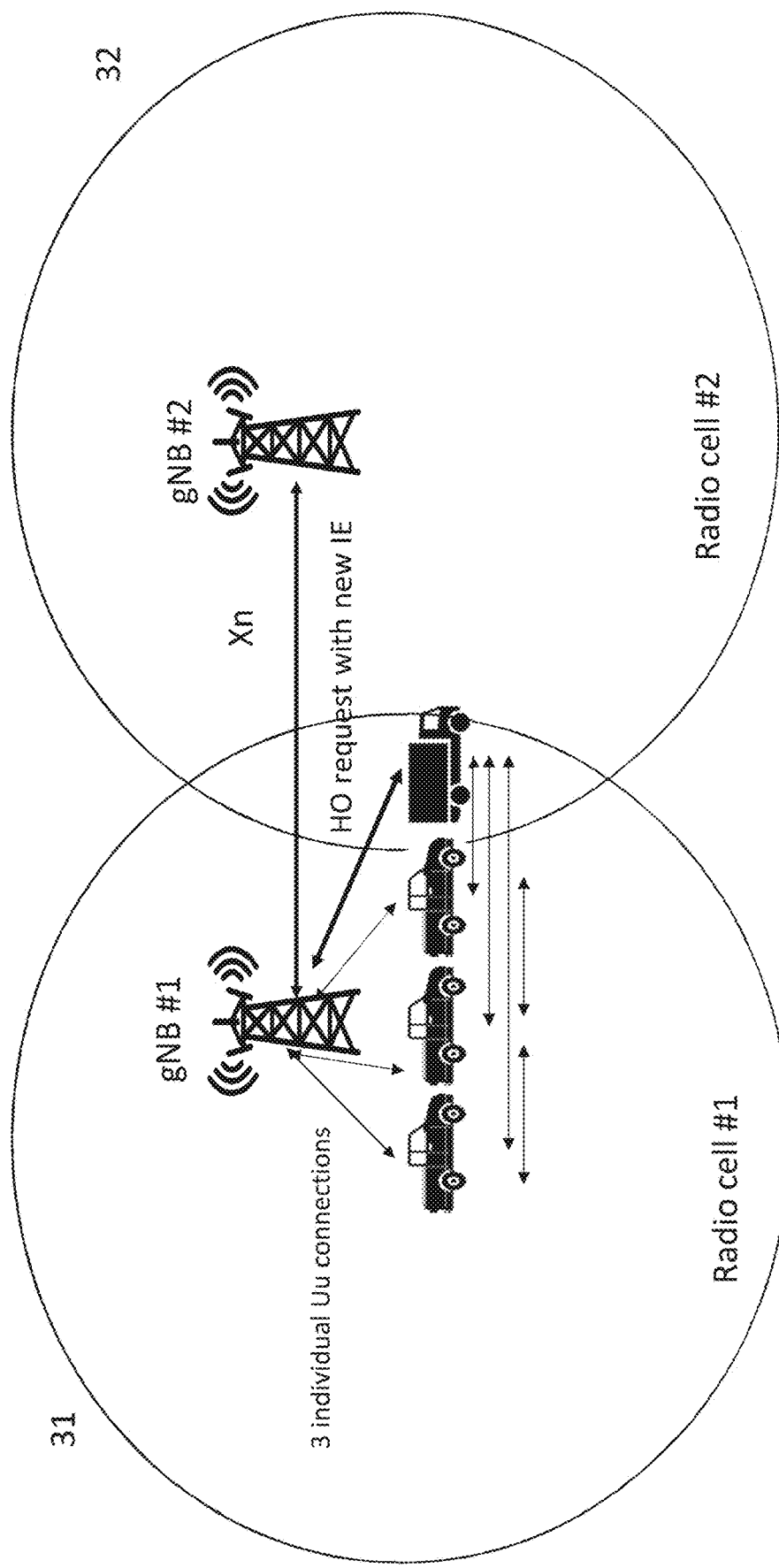
FIGS. 5 to 8 show the status of the platoon and the network and the related message exchange at different phases of the method of FIG. 2.

Step 2:

In addition to the standard Uu handover procedure, the PL includes an Information Element (IE) in the HO request (e.g. event A3 measurement report) transmitted to gNB #1 (see FIG. 5). The IE indicates that this handover request is related to a platoon handover and includes an ID of the platoon. In some example embodiments of the invention, the ID of the platoon may be considered as an indication that the HO request is related to a platoon handover such that an explicit indication of the platoon handover may be omitted. The target cell may already be aware of the SPS configuration of the platoon, e.g. by the method described in PCT/EP2018/067343. In some example embodiments an IE is included during the HO request or the HO that informs the target cell about the required SPS resource configuration of the platoon. Due to this IE, the target cell can construct SPS #2.

In addition, the IE may comprise an indication of a dedicated PM of the platoon. For example, the dedicated PM may be the last PM of the platoon. The indication of the dedicated PM might be an ID of the dedicated PM, e.g. the RNTI of the dedicated PM. Alternatively or in addition, the indication of the dedicated PM might be a number indicating the position of the dedicated PM in the platoon.

Figure 6:
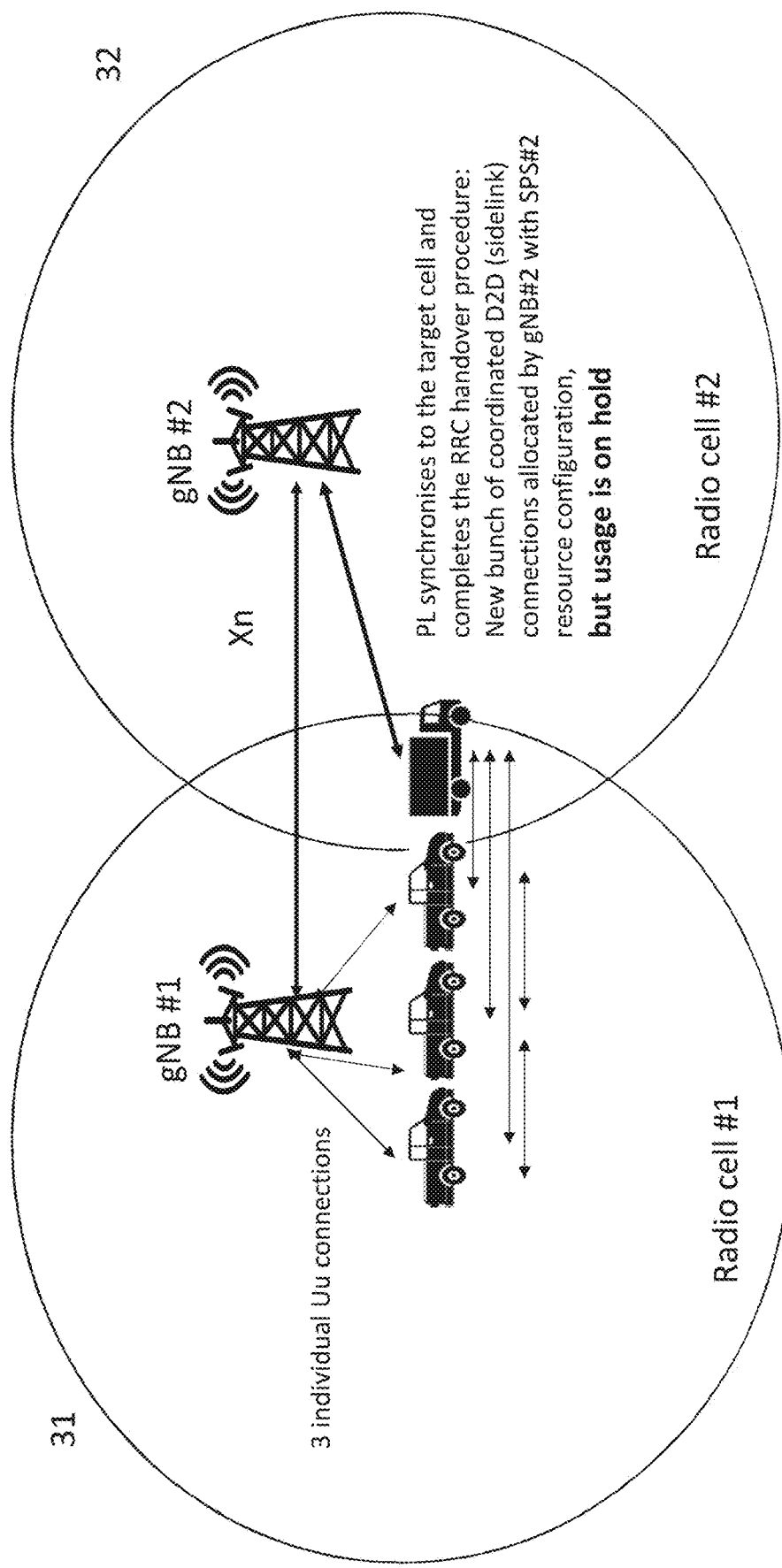

As shown in FIG. 6, when the PL has synchronized to the target cell 32, gNB #2 will send the SPS #2 resource allocation to the PL by an RRC message. Nevertheless, PL will still use the SPS #1 resource allocation, i.e. the SPS #2 resource allocation will be on hold (not activated) for platoon usage.

When the target cell 32 sends the SPS #2 resource allocation to the PL, in some example embodiments it may reserve the corresponding resources for the platoon.

In some example embodiments, at that time, the target cell 32 may pre-reserve the corresponding resources. That is, while the resources are not yet activated the target cell may still use the resources, e.g. for short term best effort grants. Nevertheless, the target cell 32 commits to provide these resources to the platoon immediately after the activation trigger. In some example embodiments with the network selected activation time, the target cell may even reserve resources that are still in use e.g. by another platoon (driving ahead of the platoon under consideration) that is in process of leaving the target cell. In an example scenario, the last PM of the platoon under consideration may be selected as the dedicated platoon member the handover of which triggers the activation. This allows using the SPS #2 resources by the platoon ahead for the needed time such that the SPS #2 resources are available for the platoon under consideration in time. Pre-reservation is not limited to the target cell 32 but each of the other involved cells may perform pre-reservation, too, when it configures a platoon UE with a resource allocation without activating the resource allocation.

In some example embodiments, the target cell 32 (or another cell) may reserve some of the resources and pre-reserve others of the resources of the SPS #2 resource allocation.

In some example embodiments of the invention, gNB #2 attempts to not allocate the resources of the SPS #1 resource allocation to other UEs (in particular: V2X UEs) in radio cell #2. Thus, interference to the platoon is avoided. For this purpose, gNB #2 may perform the procedure defined in PCT/EP2018/067343. Alternatively, the gNB #2 might request the SPS #1 resource allocation from gNB #1 after the reception of the handover request of the PL. Another alternative might be the transmission of the SPS #1 resource allocation during the HO request or the HO. In this case, either gNB #1 or PL (or both) may transmit the SPS #1 resource allocation to gNB #2.

In some example embodiments, PL does not include an identifier of the platoon in its handover request. Instead, the source cell 31 retrieves the platoon ID from its data base, based on the ID (RNTI) of the PL. Then, the source cell 31 inserts the platoon ID into the HO request which it forwards to the target cell 32. The target cell may store the platoon ID of the PL in its data base such that it may retrieve it in the future when the PL handovers from the present target cell to still another cell.

Figure 7:
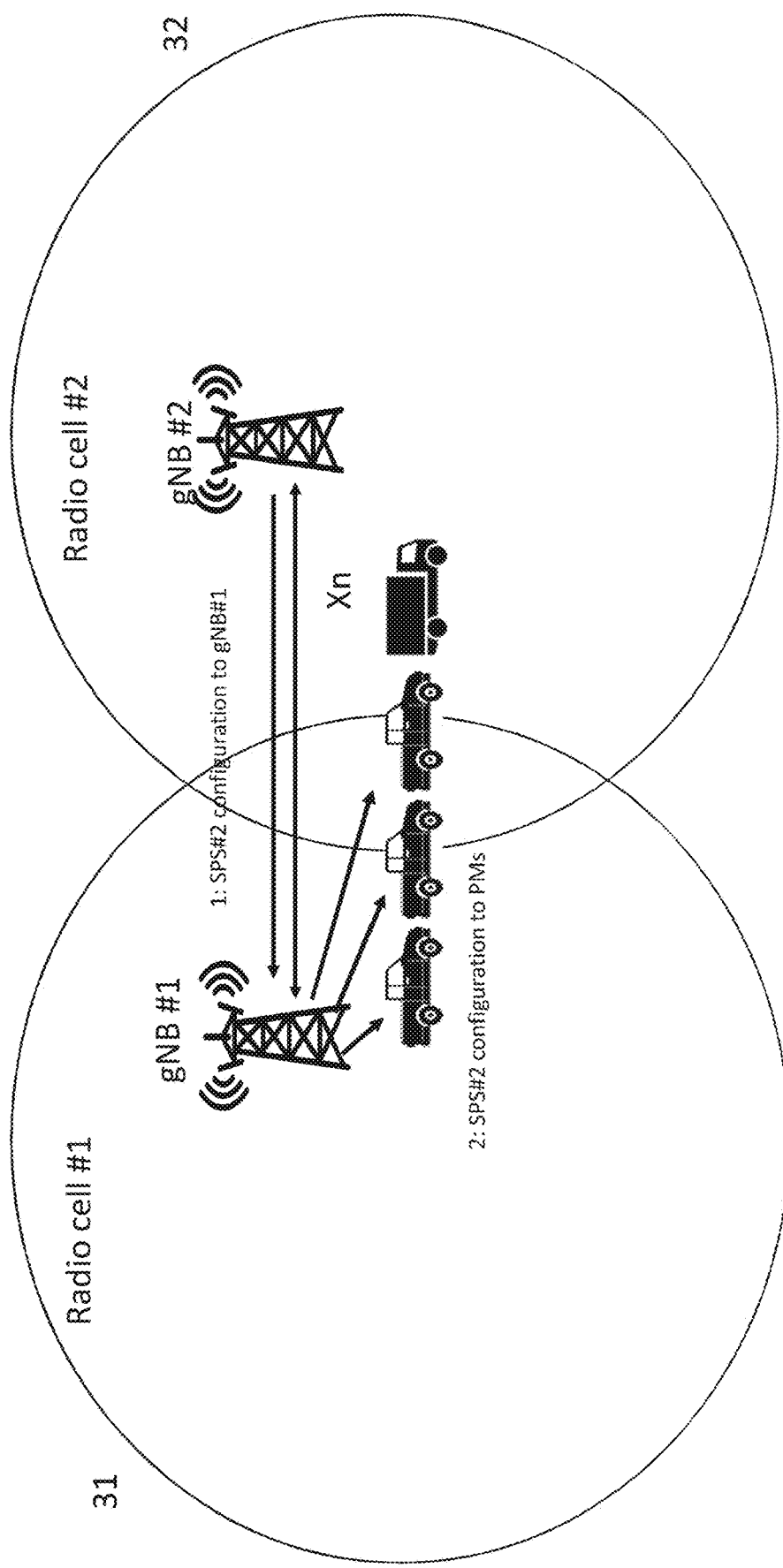

Step 3:

To reduce the HO delay, the gNB #2 sends the SPS #2 resource allocation via the Xn interface to the gNB #1 which provides all the PMs (all the PMs which are still served by the source cell 31) with this SPS #2 resource allocation, see FIG. 7. In addition, gNB #2 refers to the ID of the platoon—received in the HO request or during HO from the PL—when sending the SPS #2 resource allocation. The ID of the platoon enables gNB #1 to identify the PMs of the platoon. In the present context, "referring to" means sending, along with the SPS #2 resource allocation, a reference to said HO request of gNB #1 (which included the platoon ID), or sending an ID of the PL (e.g. RNTI of PL in source cell) such that the source cell may retrieve the platoon ID from its database, or explicitly sending the ID of the platoon, such that gNB #1 understands that SPS #2 resource allocation is intended for the PMs of the platoon. gNB #2 may send more than one of these IDs. In this case, source cell may choose them according to a certain prevalence. E.g. platoon ID may be preferred because it does not require further computational work at source cell.

In some example embodiments, this communication via the Xn interface already starts immediately (or shortly) after reception of the PL handover request by gNB #2, i.e. in parallel to the synchronization of the PL to gNB #2. Thus, the procedure may be accelerated.

As the platoon moves forward to the radio cell #2, one or more of the PMs following the PL may also request the HO to radio cell #2, wherein each of the HO requests of the PMs includes the platoon-ID. To enhance the reliability of the method, the gNB #2 may provide those PMs having requested HO to radio cell #2 with the SPS #2 resource allocation (even if this was already done by gNB #1 within radio cell #1). Also in this case, the SPS #2 resource allocation is not activated at that point in time.

Figure 8:
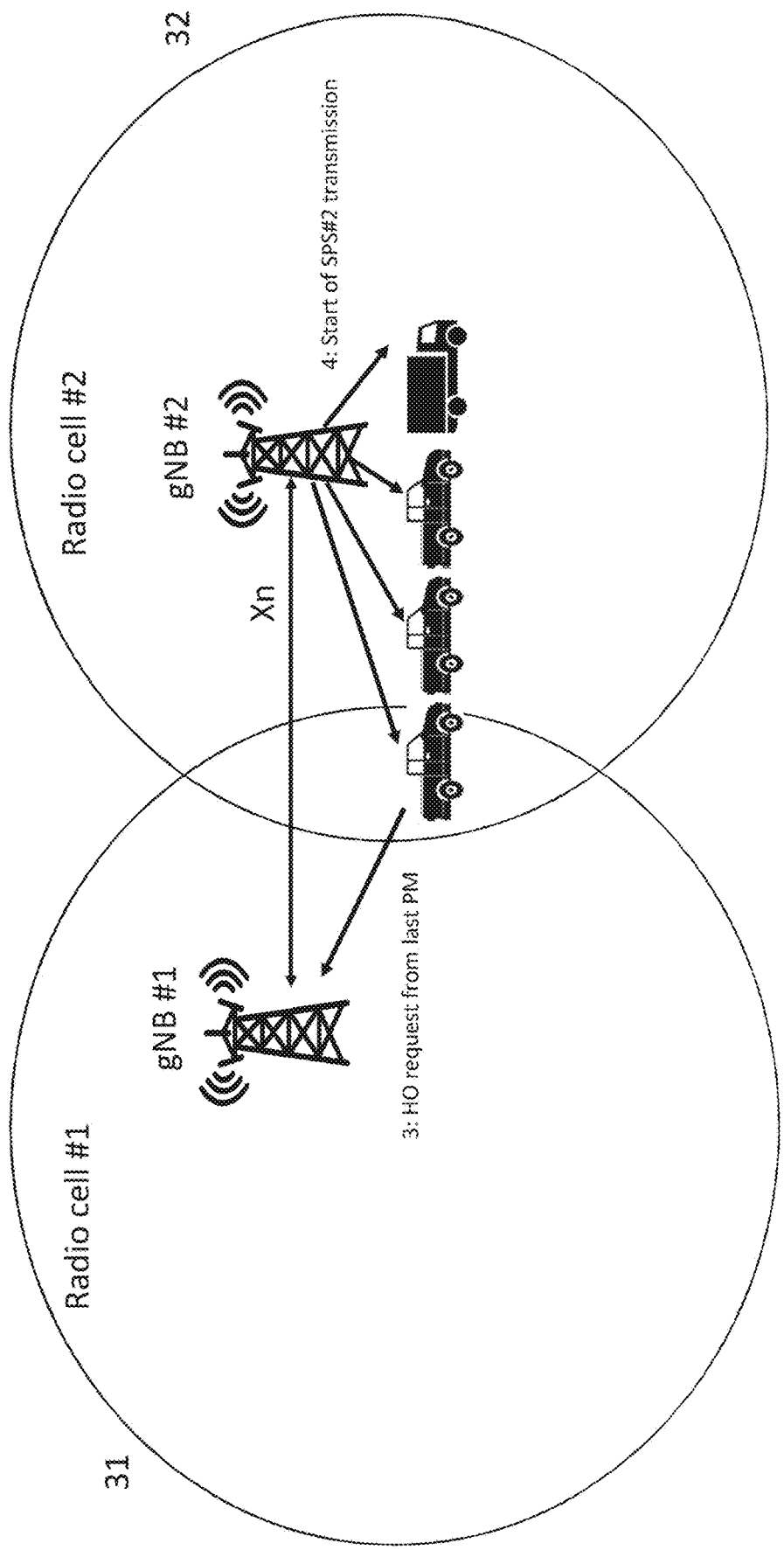

Step 4:

In the example shown in FIG. 8, the dedicated PM is the PM of the platoon last in the direction of travel. When the last PM starts the Uu based HO procedure, the gNB #2 is aware, based on the HO request from gNB #1 to gNB #2, that the entire platoon is now within the coverage of radio cell #2.

If the IE of the HO request described above comprises an ID of the last PM, gNB #2 can decide that the last PM starts the Uu based HO procedure by comparing the UE Id (RNTI) transmitted by the PM requesting HO with the UE ID transmitted by the PL in the IE of the HO request. If the IE of the HO request comprises a number, gNB #2 may count the number of served UEs with the platoon ID and compare it with the indicated number. If the IE comprises both a number and an ID, gNB #2 may consider either the earlier of the indicated PMs or the later of the indicated PMs as the dedicated PM, dependent on the implementation. In some embodiments, PL may indicate that the PM last in the direction of travel (last PM) is the dedicated PM, without indicating a number or a UE ID. gNB #2 knows the total number of PMs in the platoon from the SPS resource allocation. Thus, gNB #2 may count the number of served UEs with the platoon ID and compare it with the total number.

When the dedicated PM requests Uu based HO from gNB #1, the request is forwarded to gNB #2 via Xn interface. Thus, gNB #2 is aware that the entire platoon is within the coverage area of cell #2. Then, gNB #2 sends an activation signal to the PL and PMs to activate the SPS #2 resource allocation in the PL and PMs. gNB #2 has two options for such an activation signal:

Option 1: individual RRC messages to the PL and all PMs
Option 2: one RRC message to the PL which is relayed by the PL. I.e., the PL informs all PMs to switch to the SPS #2 resources. PL1 has to send the relay information (activation signal) using the still active SPS #1 resource allocation.

Compared to individually configuring the PMs with SPS #2 resource allocation at the respective HOs, the method according to some example embodiments of the invention is faster because the PMs receive the SPS #2 resource allocation prior to the switch to these resources. The providing of the SPS #2 resource allocation according to some example embodiments of the invention is less time critical than the providing during the individual HOs as according to the prior art.

Figure 9:
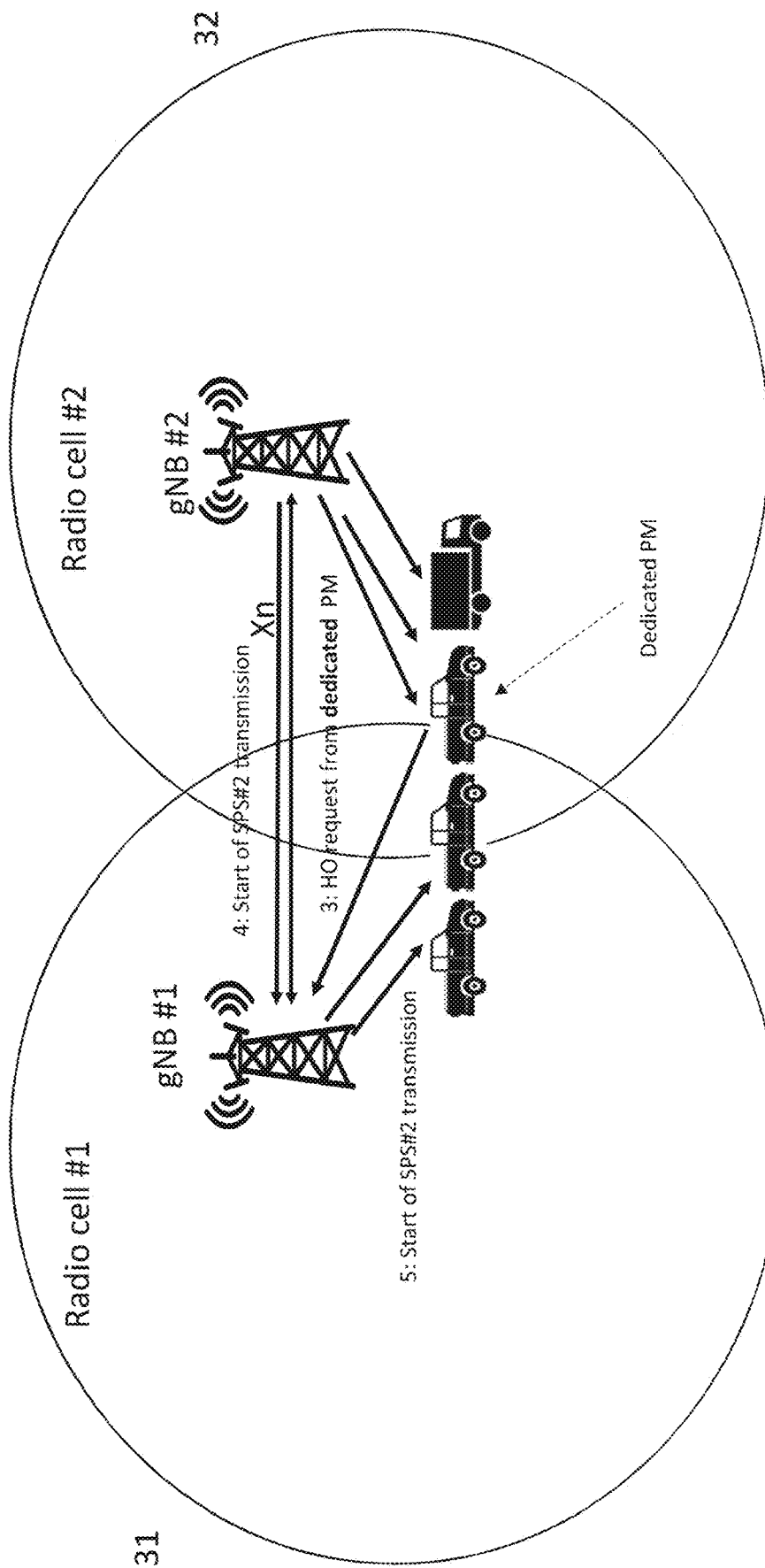
FIG. 9 shows the status of the platoon and the network and the related message exchange at step 4 of an alternative method according to an example embodiment of the invention.

In some example embodiments of the invention, the PL indicates in step 2 (FIG. 5) one dedicated PM different from the last PM, e.g. a car in the middle of the platoon. If the dedicated PM requests handover from gNB #1, the request is forwarded to gNB #2. This request triggers the switch between the SPS resources. In this case, both gNB #1 and gNB #2 are involved in the triggering of the switching of the SPS resource allocation, each of these gNBs for those PMs served by them. In order to enable gNB #1 to activate SPS #2 resource allocation in the PMs served by gNB #1, gNB #2 sends a trigger message to gNB #1 over Xn interface, which is depicted in FIG. 9.

In some example embodiments of the invention the criterion to determine the trigger time to activate the new resource allocation is determined on the network side. The trigger time may be any point in time between the HO request of the PL and the performing of the HO of the last PM. In some example embodiments, on the criterion may be determined by a negotiation of the target cell and the source cell. This negotiation may take into account how to distribute the interference between the cells, and/or the availability of the SPS resources in the source cell and the target cell. In some example embodiments, only one of the source cell and the target cell determines the criterion to determine the trigger time. If only the source cell determines the criterion, it informs the target cell on the criterion via Xn interface.

Thus, in such example embodiments there is no need for the PL to indicate a dedicated car with the HO request. Apart from this omission, all of the other aspects of the previous example embodiments may still hold, including that both gNB #1 and gNB #2 may be involved in the triggering of the switching of the SPS resource allocation from SPS #1 to SPS #2, each of these gNBs for those PMs served by the respective gNB.

If in such example embodiments PL nevertheless includes into its HO request an indication of a dedicated PM, the gNB(s) deciding on the criterion to determine the trigger time may take this indication into account as an indication of a preference. Alternatively, they may discard the indication of the dedicated PM. Still alternatively, the indication of the dedicated PM may make oblivious a determination of the criterion by the network. I.e., in these example embodiments, the indication of a dedicated PM by the PL overrules any determination of a criterion on the network side.

In another example embodiment of the invention, the switching from SPS #1 to SPS #2 happens earlier, namely right after HO of the PL. This example embodiment is preferred when the cell #2 cannot support SPS #1 resource allocation but cell #1 can support the new SPS #2 resource allocation.

In this case, the PL is reconfigured with SPS #2 by cell #2 during the HO and all other PM should be reconfigured with SPS #2 by cell #1, so that the platoon can start using SPS #2 even before any PMs handover to cell #2. In such example embodiments, cell #2 informs or negotiates the new resource allocation with cell #1 via Xn and cell #1 allocates the resources for SPS #2. Cell #1 provides all PMs with SPS #2 resource allocation. The switching is then synchronously activated by cell #2 for the PL and by cell #1 for all PMs. The trigger event for switching may be the HO command to the PL in cell #1. Cell #1 and cell #2 may activate SPS #2 resource allocation in their respective PL and PMs immediately after the trigger event or after a predetermined time after the trigger event has lapsed.

In still another example embodiment, cell #1 and cell #2 may activate SPS #2 resource allocation in their respective PL and PMs immediately after the trigger event but the activation comprises an indication of a time period. PL and PMs will activate SPS #2 only after this time period has lapsed.

In some example embodiment, the activation is triggered at a fixed point in time, signalled by cell #1 to cell #2 or by cell #2 to cell #1.

Due to these options, the activation of SPS #2 resource allocation in the platoon may take place at any time between the HO of the PL and the HO of the last PM. This added flexibility can be used when the negotiated SPS #2 between cell #1 and cell #2 requires some time to free or reallocate resources of other UEs for the platoon or to compromise the conflict of allocations between cell #1 and cell #2 (e.g. minimisation of unavoidable interference).

Figure 17:
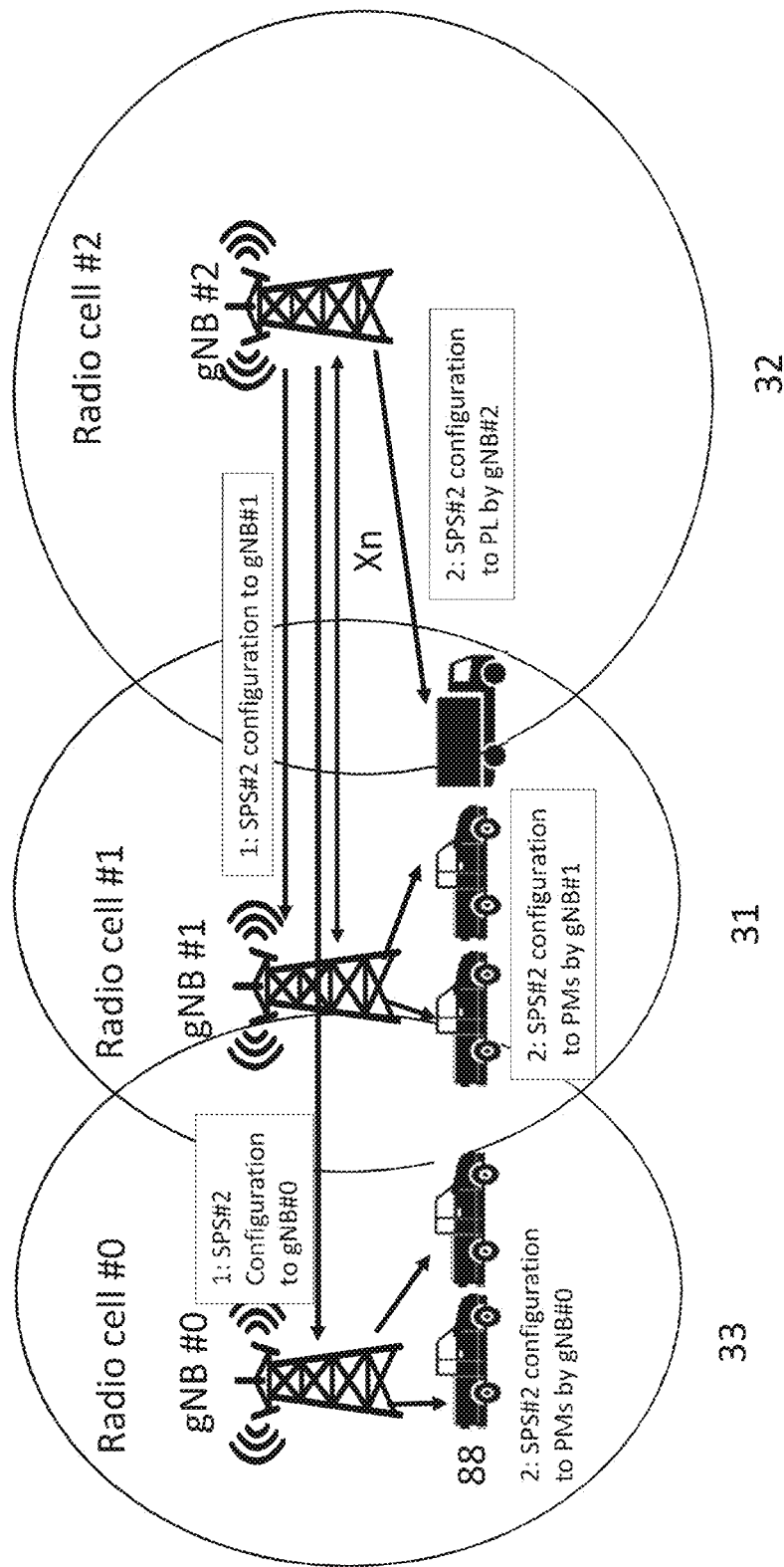
FIG. 17 shows the status of the platoon and the network in case the platoon extends over more than two cells.

According to some example embodiments of the invention, the method is applied to a multi cell environment, where the (longitudinal) elongation of the platoon covers more than two radio cells while the platoon leader is carrying out handover (see the example of FIG. 17, where the platoon extends over cell #2 32, cell #1 31, and cell #0 33).

In this case, the gNB #2 of radio cell #2 32 has to send the SPS #2 configuration along with the platoon ID to more than one gNB. The identifier of the relevant gNBs may be based on an additional IE within the handover request of the PL (see step 2) to gNB #1. This IE could be the cell IDs of the one or more further radio cells, which are known in the radio access network, e.g. the Physical Cell ID (PCI). The gNB #1 includes this IE (i.e. the list of Cell IDs) within the HO request to gNB #2 over the Xn interface. Each of these cells may identify the PMs of the platoon it still serves by the platoon ID for sending the SPS configuration or the resource activation trigger.

The gNB #2 is then aware that the SPS #2 configuration has to be send to the gNB #1—since gNB #1 is requesting the handover for the platoon leader—and also to gNB #0 identified by its PCI, i.e. gNB #2 sends two messages each comprising the SPS #2 resource allocation and the Platoon-ID. The configuration of the PMs with SPS #2 is carried out by gNB #0, gNB #1, and gNB #2 for their respective PMs, the PL is configured by gNB #2 (according to step 2).

The dedicated platoon member may be identified by a RNTI allocated by its serving cell 33, and optionally additionally by the PCI of its serving cell 33, i.e. the PCI of gNB #0 in FIG. 17. This is particularly useful if the triggering of the activation is based on a handover of a dedicated PM (in the example of FIG. 17: the last PM 88), which may be served by a serving cell different from the source cell 31 and the target cell 32 (e.g. cell #0 33 of FIG. 17). In some example embodiments, the handover of the dedicated PM from its serving cell to a further cell (which may be the source cell, or the target cell, or a further cell different from each of the service cell, the source cell, and the target cell) may trigger the activation of the SPS #2 configuration.

A start/activation of SPS #2 transmission corresponding to that of FIG. 9 is not shown in FIG. 17. After the PL and PMs are configured with SPS #2 resource allocation, gNB #2 may trigger the activation by respective messages to gNB #1 and gNB #0.

If the platoon expands over even more radio cells, all affected PCIs may be reported by the platoon leader during the handover procedure and all radio cells/gNBs are configured (and triggered for activation) by gNB #2 based on their PCIs.

With a dynamic selection of the different example embodiments of the invention, there is a high probability that SPS conflicts during HO can be resolved or mitigated and the platoon can drive safely even for long routes, like the said trip from Hamburg to Munich.

Some main features of this application are:
Platoon handover with bulk reservation of all required SPS resources for PL and all PM in the target cell
Synchronous activation of the new SPS resource allocation at any point in time between the Uu handovers of the PL and last PM to the target cell. This switching time can be defined either by the involved gNBs or by the PL, e.g. by defining the HO of the PL or of one specific PM as triggering event.
Communication of ID of a dedicated PM by PL during HO and/or the number of UEs in the platoon
Communication of a platoon ID during HO
Blocking as much as possible of SPS #1 resources in cell #2 until dedicated PM is in new cell
Allocation of SPS #2 resources for PL and PMs already in radio cell #1
Uu messages for coordination and switching between SPS resource allocations
Xn communication between cells for exchange and negotiation of SPS resources
Providing of SPS #2 resource allocation to PM in radio cell #1 before their individual HO.

Figure 11:
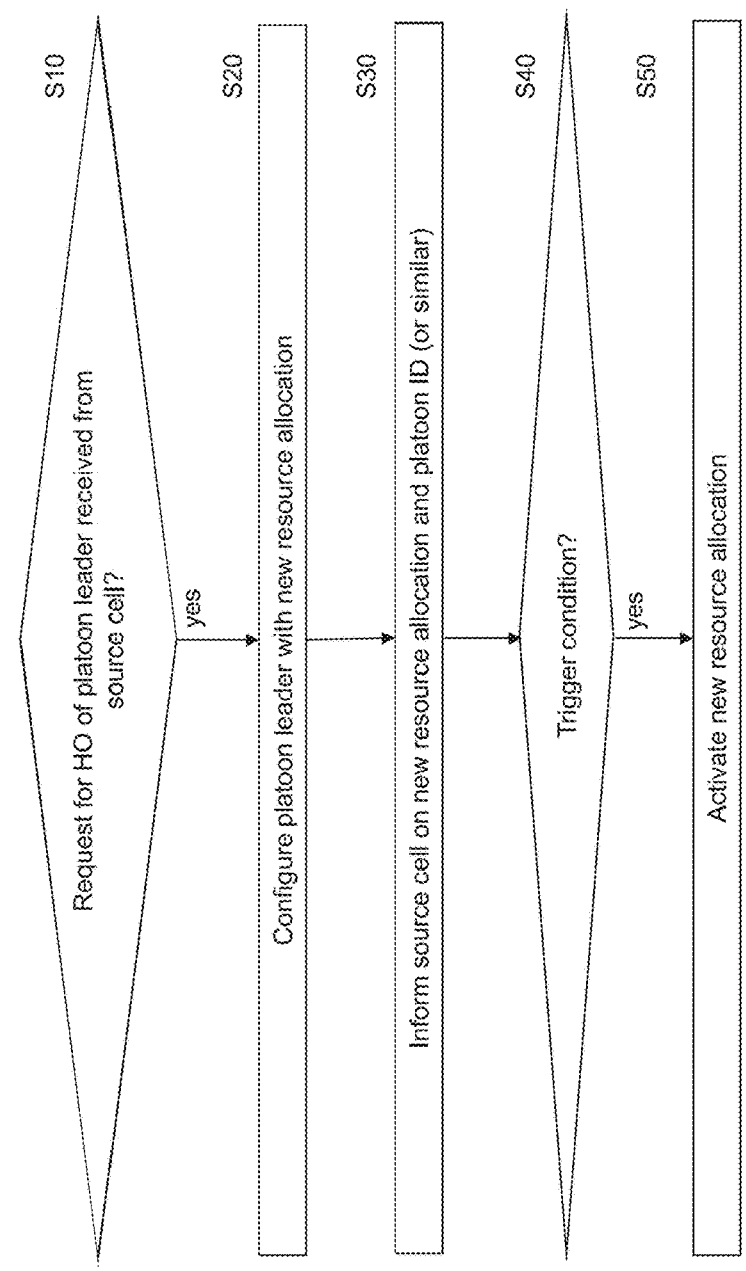
FIG. 11 shows a method according to an example embodiment of the invention.
Figure 10:
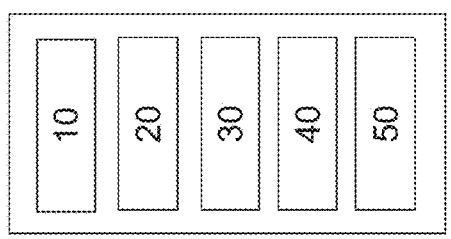
FIG. 10 shows an apparatus according to an example embodiment of the invention.

FIG. 10 shows an apparatus according to an example embodiment of the invention. The apparatus may be a base station or a cell such as a target cell 32 or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for monitoring 10, means for configuring 20, means for informing 30, means for checking 40, and means for activating 50. The means for monitoring 10, means for configuring 20, means for informing 30, means for checking 40, and means for activating 50 may be a monitoring means, configuring means, informing means, checking means, and activating means, respectively. The means for monitoring 10, means for configuring 20, means for informing 30, means for checking 40, and means for activating 50 may be a monitor, configurer, informer, checker, and activator, respectively. The means for monitoring 10, means for configuring 20, means for informing 30, means for checking 40, and means for activating 50 may be a monitoring processor, configuring processor, informing processor, checking processor, and activating processor, respectively.

The means for monitoring 10 monitors if a request for a handover of a platoon leader of a platoon from a source cell to a target cell is received from the source cell (S10). The request for the handover of the platoon leader comprises an identifier of the platoon.

If the request for the handover of the platoon leader is received (S10="yes"), the means for configuring 20 configures the platoon leader with a new resource allocation (S20). The means for informing 30 informs the source cell on the new resource allocation along with an information element which enables the source cell to identify the platoon (S30). Examples of such a resource element are the identifier of the platoon, an identifier of the platoon leader, and a reference to the request for the handover of the platoon leader, or a combination of these elements.

The means for checking 40 checks if a trigger event occurs (S40). The trigger event may be predefined. If the trigger event occurs (S40="yes"), the means for activating 50 activates the new resource allocation in the platoon leader (S50).

FIG. 12 shows an apparatus according to an example embodiment of the invention. The apparatus may be a UE such as a UE of a platoon leader or of a platoon member or an element thereof. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for refusing 310. The means for refusing 310 may be a refusing means. The means for refusing 310 may be a refuser. The means for refusing 310 may be a refusing processor.

The means for refusing 310 refuses activating of a new resource allocation received from a cell before an activation signal is received (S310).

FIG. 14 shows an apparatus according to an example embodiment of the invention. The apparatus may be a base station (e.g. gNB) or a cell such as a source cell or an element thereof. FIG. 15 shows a method according to an example embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus comprises means for monitoring 410, means for identifying 415, and means for configuring 420. The means for monitoring 410, means for identifying 415, and means for configuring 420 may be a monitoring means, identifying means, and configuring means, respectively. The means for monitoring 410, means for identifying 415, and means for configuring 420 may be a monitor, identifier, and a configurer, respectively. The means for monitoring 410, means for identifying 415, and means for configuring 420 may be a monitoring processor, identifying processor, and configuring processor, respectively.

The means for monitoring 410 monitors if a new resource allocation is received along with an information element enabling the apparatus to identify a platoon (S410). The information enabling the apparatus to identify a platoon may comprise an identifier of the platoon, an identifier of a platoon leader of the platoon, and a reference to a request for a handover of the platoon leader, or a combination thereof.

If the new resource allocation is received along with the information enabling the apparatus to identify the platoon (S410="yes"), the means for identifying 415 identifies platoon members of the platoon based on the information enabling the apparatus to identify the platoon (S415). The means for configuring 420 configures the identified platoon members of the platoon with the new resource allocation (S420).

FIG. 16 shows an apparatus according to an example embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 11, 13, and 15.

Some example embodiments of the invention are described which are based on a 3GPP network (e.g. E-UTRAN or NR). However, the invention is not limited to 3GPP networks. It may be applied to other radio networks where the network (and not the terminals) allocates resources to the terminals.

A UE is an example of a terminal. However, the terminal (UE) may be any device capable to connect to the radio network such as a MTC device, a D2X device etc.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a base station (e.g. a gNB or eNB,) or a cell thereof, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a terminal (e.g. a UE), in particular a UE of a platoon leader or platoon member, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:
1. A network apparatus, comprising:
at least one memory including computer program code;
at least one processor configured to execute the computer program code and cause the network apparatus at least to, monitor whether a handover request from a platoon leader of a platoon is received from a source cell,
  the handover request from the platoon leader requesting a radio handover from the source cell to a target cell,
  the platoon including the platoon leader and one or more platoon members, and
  the handover request including an identifier of the platoon, the identifier of the platoon comprising at least one of, a position and an identifier of a dedicated platoon member from the one or more platoon members, the dedicated platoon member being different from the platoon leader;
send a new resource allocation to the platoon leader after the handover request from the platoon leader is received;
inform the source cell of the new resource allocation along with the identifier of the platoon, an identifier of the platoon leader, and a reference to the handover request from the platoon leader; and
configure the platoon leader with the new resource allocation in response to a trigger event occurring, the trigger event occurring when a handover request from the dedicated platoon member is received.

2. The network apparatus according to claim 1, wherein the at least one processor is configured to execute the computer program code and cause the network apparatus at least to
  judge whether all resources of a former resource allocation may be used by the platoon in the target cell, wherein the former resource allocation is received from the platoon leader or the source cell with respect to the platoon; and
  inhibit at least one of the informing and the configuring if all resources of the former resource allocation may be used by the platoon in the target cell.

3. The network apparatus according to claim 1, wherein the at least one processor is configured to execute the computer program code and cause the network apparatus at least to
  judge whether at least one resource of a former resource allocation may be used by the platoon in the target cell, wherein the former resource allocation is received from the platoon leader or the source cell with respect to the platoon; and
  prohibit the target cell from configuring a user equipment not belonging to the platoon with the at least one resource of the former resource allocation when the at least one resource of the former resource allocation may be used by the platoon in the target cell.

4. The network apparatus according to claim 1, wherein the configuring configures the new resource allocation in at least one platoon member from the one or more platoon members, and the platoon leader in response to the trigger event occurring.

5. The network apparatus according to claim 1, wherein the handover request from the platoon leader comprises an identifier of a further cell different from each of the source cell and the target cell; and
  the informing informs the further cell on the new resource allocation along with the identifier of the platoon.

6. The network apparatus according to claim 5, wherein the informing informs the further cell fully or partly in parallel to the configuring of the platoon leader.

7. The network apparatus according to claim 5, wherein the at least one processor is configured to execute the computer program code and cause the network apparatus at least to
  trigger the source cell and the further cell in response to the trigger event occurring.

8. The network apparatus according to claim 7, wherein the at least one processor is configured to execute the computer program code and cause the network apparatus at least to
  forbid the triggering of the source cell in response to the trigger event occurring at or during a handover of a last platoon member from the platoon from the source cell to the target cell.

9. The network apparatus according to claim 1, wherein the informing informs the source cell fully or partly in parallel to the configuring of the platoon leader.

10. The network apparatus according to claim 1, wherein at least one of the handover request from the platoon leader and a message in the handover request from the platoon leader comprises a description of the new resource allocation.

11. A network apparatus, comprising:
  at least one memory including computer program code;
  at least one processor configured to execute the computer program code and cause the network apparatus at least to,
    monitor whether a new resource allocation is received along with an information enabling the network apparatus to identify a platoon;
    identify platoon members from the platoon based on the information;
    send the new resource allocation to the platoon members in response to identifying the platoon members; and
    configure at least one of the platoon members with the new resource allocation in response to a trigger event occurring, the trigger event occurring when a handover request from a dedicated platoon member is received, the dedicated platoon member being different from a platoon leader.

12. The network apparatus according to claim 11, wherein the configuring configures all the platoon members of the platoon with the new resource allocation in response to the trigger event.

13. The network apparatus according to claim 11, wherein the at least one processor is configured to execute the computer program code and cause the apparatus at least to
  retrieve an identifier of the platoon based on a handover request from the platoon leader requesting a radio handover from a source cell to a target cell; and
  add the identifier of the platoon to the handover request before the handover request is forwarded to the target cell.

14. The network apparatus according to claim 11, wherein the information comprises an identifier of the platoon, an identifier of the platoon leader from the platoon, and a reference to a handover request from the platoon leader, the identifier of the platoon includes at least one of, a position and an identifier of the dedicated platoon member from the platoon members.

15. A method of operating a network apparatus, the method comprising:
  monitoring whether a handover request from a platoon leader from a platoon is received from a source cell,
    the handover request from the platoon leader requesting a radio handover from the source cell to a target cell,
    the platoon including the platoon leader and one or more platoon members, and
    the handover request from the platoon leader including an identifier of the platoon, the identifier of the platoon comprising at least one of, a position and an identifier of a dedicated platoon member from the one or more platoon members, the dedicated platoon member being different from the platoon leader;

sending a new resource allocation to the platoon leader after the handover request from the platoon leader is received;

informing the source cell of the new resource allocation along with the identifier of the platoon, an identifier of the platoon leader, and a reference to the handover request from the platoon leader; and configuring the platoon leader with the new resource allocation in response to a trigger event occurring, the trigger event occurring when a handover request from the dedicated platoon member is received.

16. The method according to claim 15, comprising:

configuring the platoon leader with the new resource allocation in response to the trigger event occurring, the trigger event occurring based on a negotiation with the source cell.

* * * * *

UNITED STATES PATENT AND TRADEMARK OFFICE
CERTIFICATE OF CORRECTION

| | |
|---|---|
| PATENT NO. | : 11,805,449 B2 |
| APPLICATION NO. | : 17/272804 |
| DATED | : October 31, 2023 |
| INVENTOR(S) | : Dereje Kifle et al. |

It is certified that error appears in the above-identified patent and that said Letters Patent is hereby corrected as shown below:

On the Title Page

Item (56) Other Publications Data should read:
Office Action for Indian Application No. 202147014256 dated February 8, 2022

Signed and Sealed this
Twenty-sixth Day of March, 2024

*Katherine Kelly Vidal*

Katherine Kelly Vidal
*Director of the United States Patent and Trademark Office*